Oct. 13, 1931.  W. WOOLCOTT  1,827,059
WEATHERPROOF ADJUSTABLE CANOPY FOR VEHICLES
Filed March 26, 1930  5 Sheets-Sheet 1
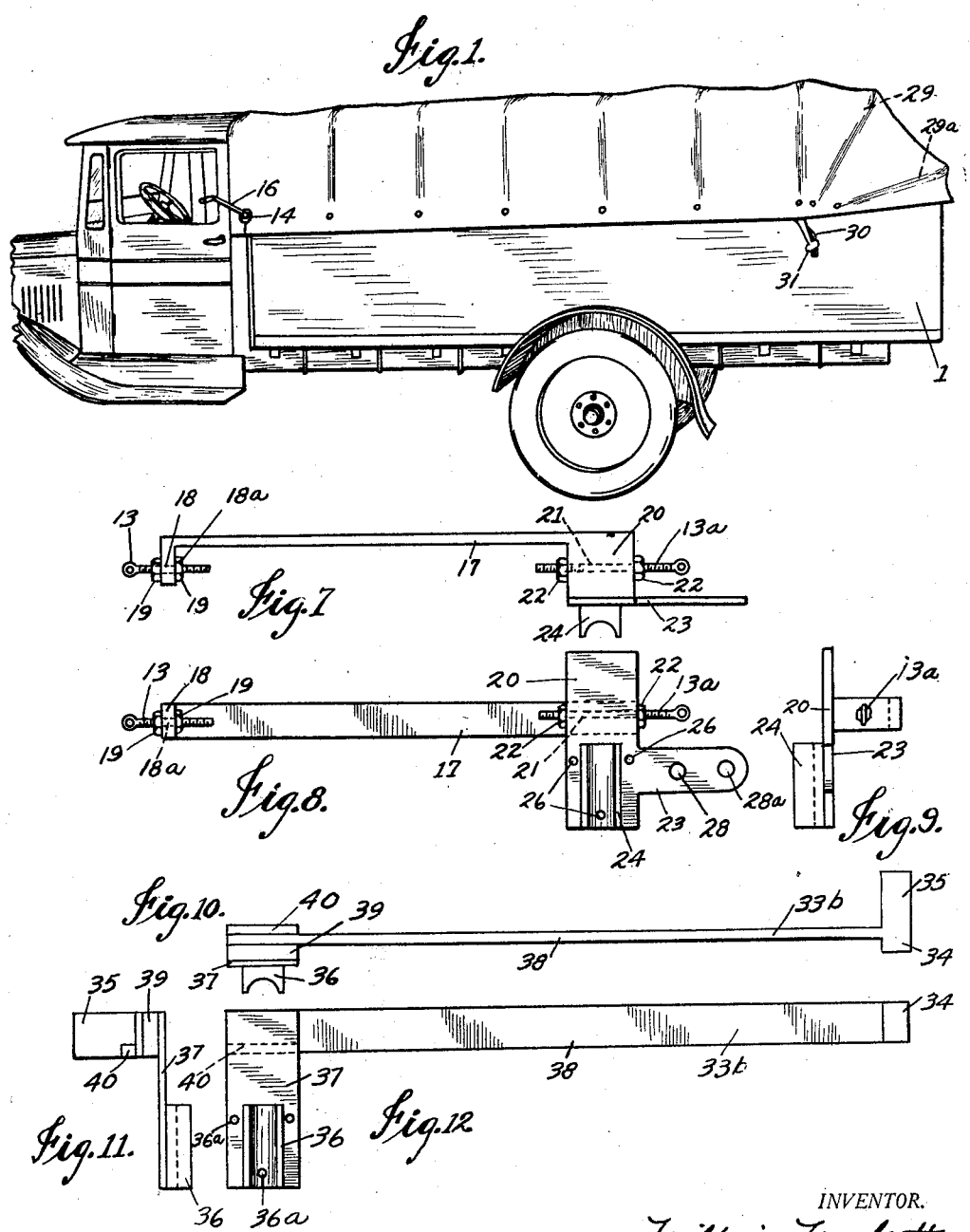
INVENTOR.
William Woolcott
BY
ATTORNEYS

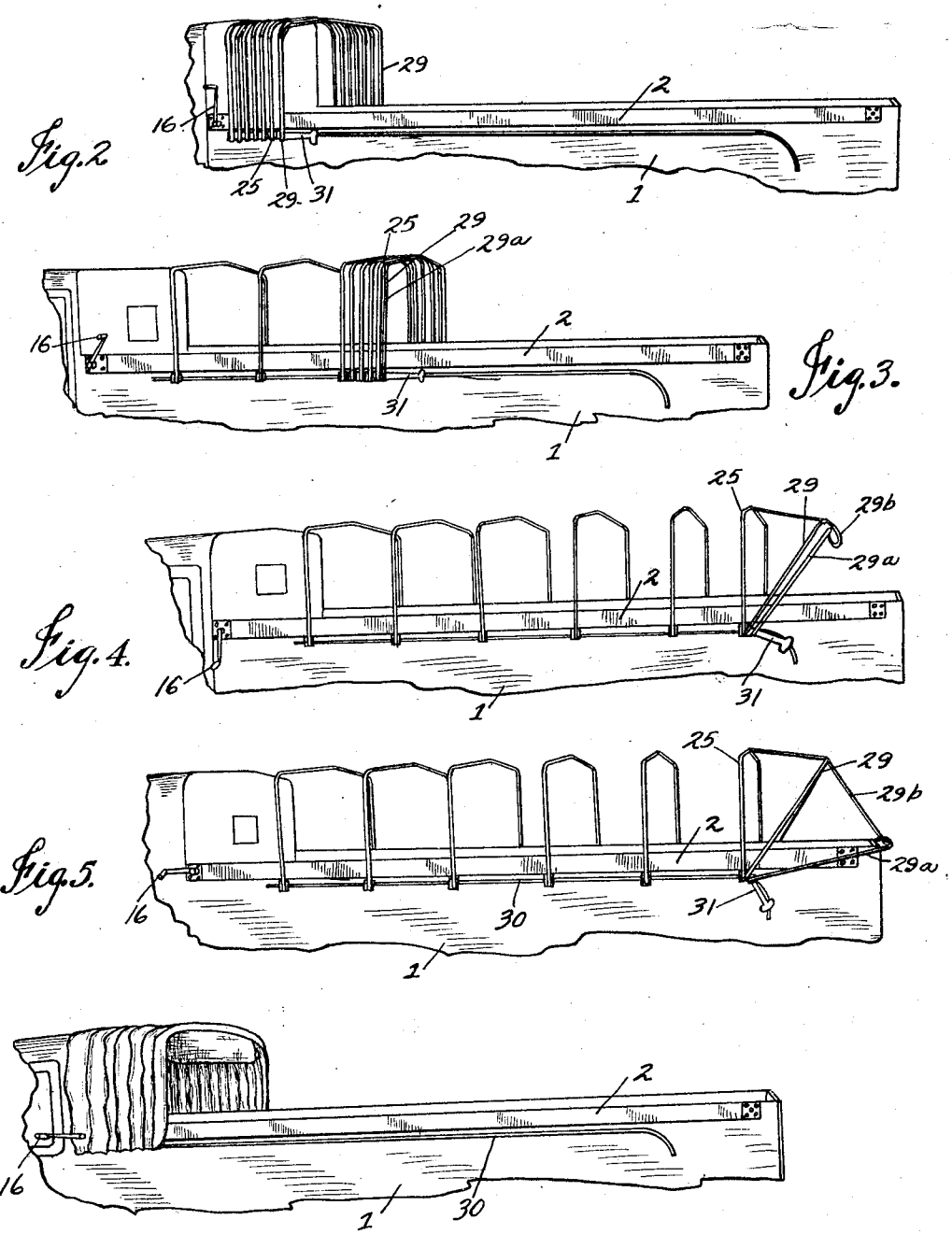

Oct. 13, 1931. W. WOOLCOTT 1,827,059
WEATHERPROOF ADJUSTABLE CANOPY FOR VEHICLES
Filed March 26, 1930   5 Sheets-Sheet 3
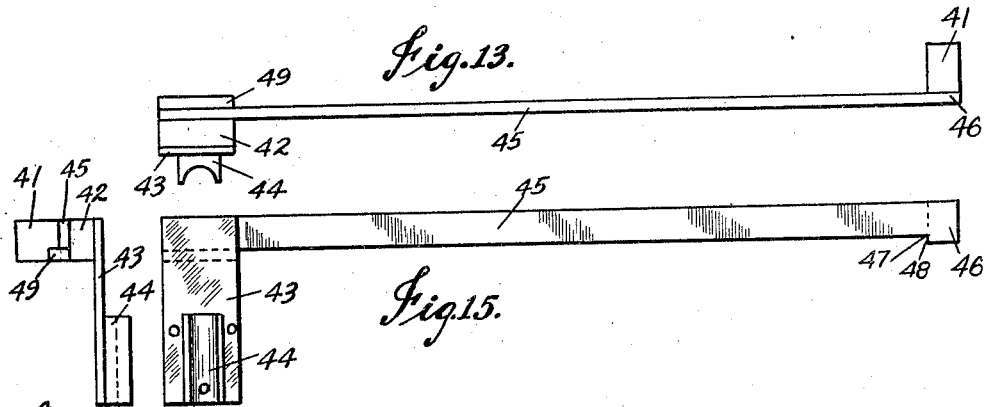
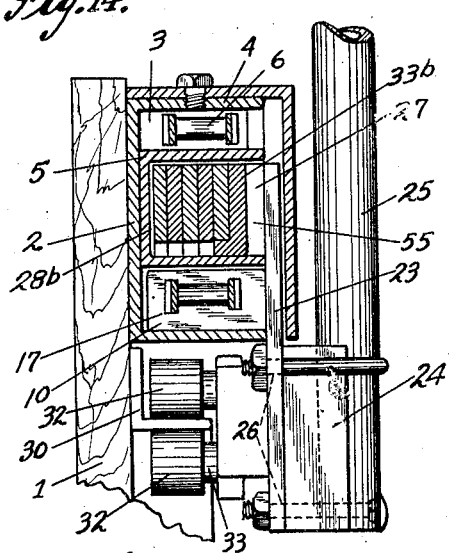
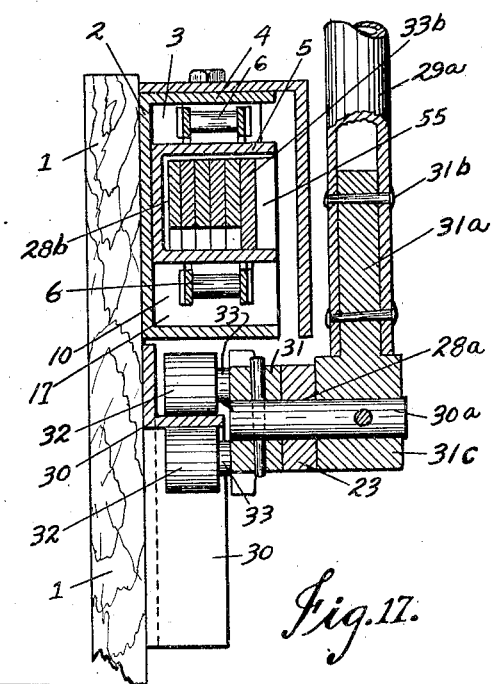
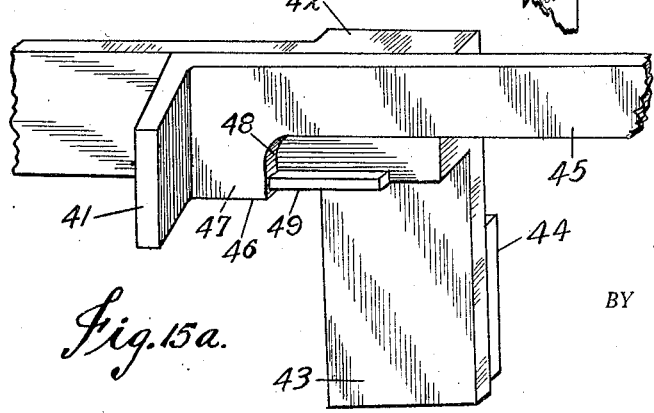
INVENTOR.
William Woolcott
BY
*(signature)*
ATTORNEYS

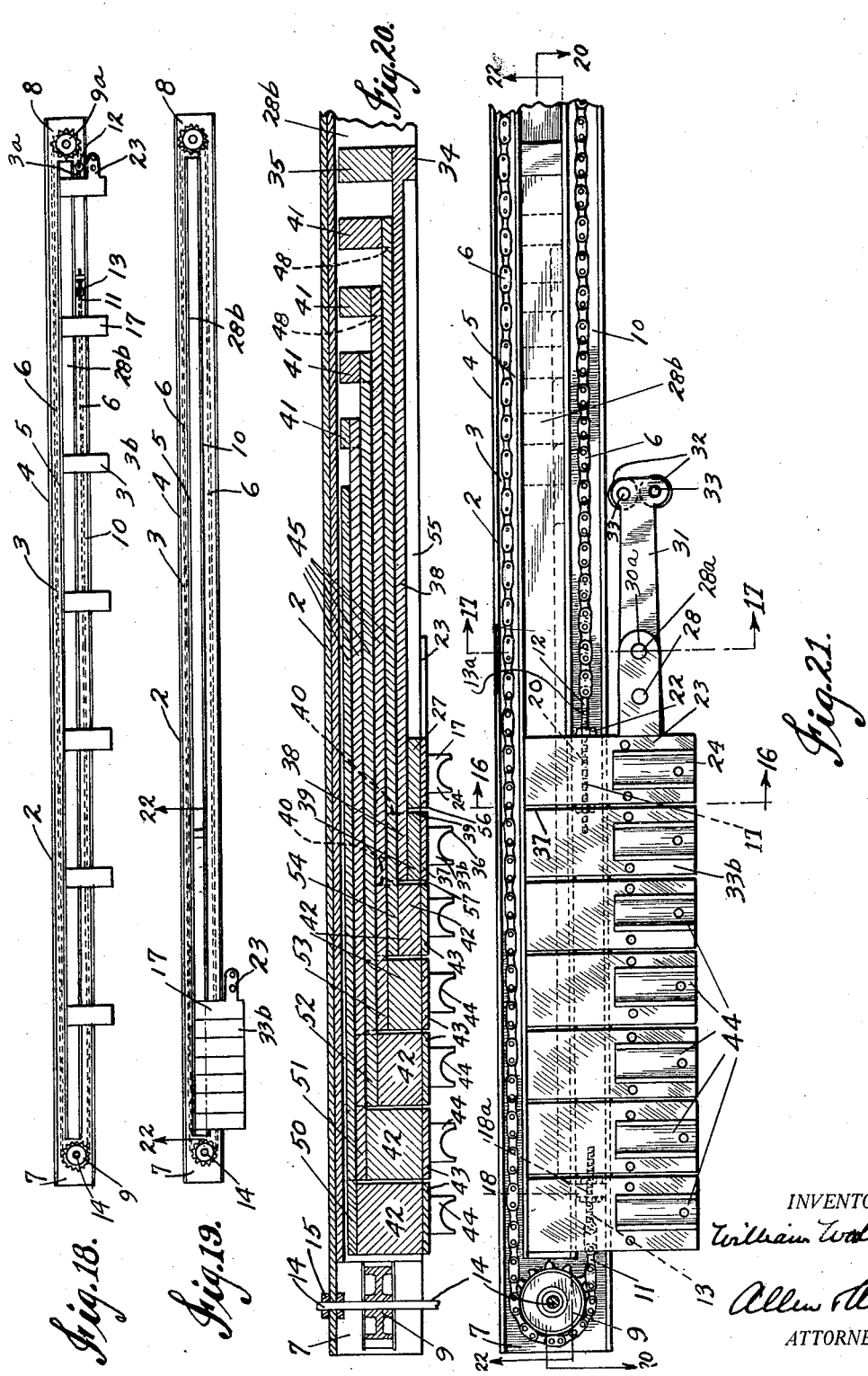

Oct. 13, 1931.  W. WOOLCOTT  1,827,059
WEATHERPROOF ADJUSTABLE CANOPY FOR VEHICLES
Filed March 26, 1930   5 Sheets-Sheet 5
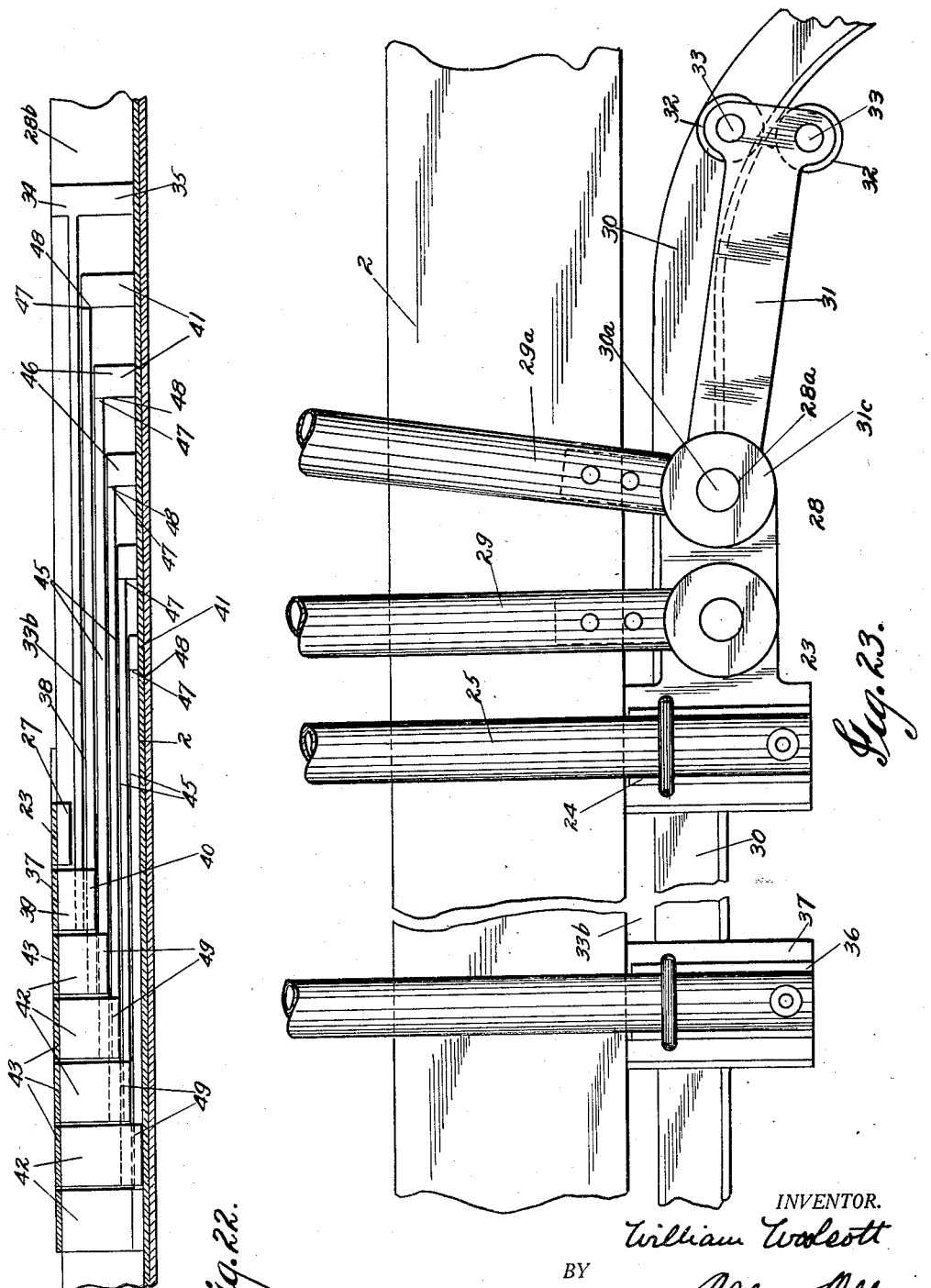
INVENTOR.
William Woolcott
BY
Allen & Allen
ATTORNEYS Patented Oct. 13, 1931

1,827,059

UNITED STATES PATENT OFFICE

WILLIAM WOOLCOTT, OF WINCHESTER, KENTUCKY

WEATHERPROOF ADJUSTABLE CANOPY FOR VEHICLES

Application filed March 26, 1930. Serial No. 439,170.

My invention relates to that type of canopy or top which can readily be collapsed or extended to cover any or all parts of the truck from some remote point on the truck or vehicle.

It is an object of my invention to provide a weather proof vehicle top which can be extended to cover a part or all of the truck as desired, by remote control mechanism.

It is also an object of my invention to provide a mechanical means to collapse or extend the canopy or cover that will operate from some central point either manually or by power.

Another object is to provide a mechanical controlled means for extending or collapsing the canopy or cover that will require a minimum of space when collapsed and be capable of extending the canopy the required amount.

A further object is to provide a series of rigidly supported bows with mechanical means for inducing their relative movement to extended or retracted position in which the bows will at all times be held firmly so that wear of the parts and the bumping of the vehicle over rough road surfaces will not cause the bow supports to become loose and rattle.

Another object is the provision of a series of shoe actuating members which are firmly set in channels in which the shoes are slidable, and in which the relative movement of the bows are caused by one shoe affecting the movement of an adjacent shoe, and vice versa.

Another object is the provision of a simple efficient mechanical movement for an end bow which swings down through an arc to completely cover the open rear end of the truck body.

Broadly, it is the object of my invention to provide a telescoping mechanism to extend or collapse a cover or canopy for vehicles, in which the mechanism is arranged so as to occupy a minimum of space, and in which a commercially practical top cover is provided which will operate easily and yet which will not rattle.

The foregoing and other objects which will be more specifically pointed out in the following description, I accomplish by that certain combination and arrangement of parts of which I have illustrated a preferred embodiment.

Referring to the drawings:

Figure 1 is a perspective view of a motor truck equipped with my improved top in which the cover is completely extended over the truck.

Figure 2 is a detail perspective view showing the bows completely collapsed against the cabin of the truck.

Figure 3 is a detail perspective view showing the bows, without the canvas cover, half way extended.

Figure 4 is a detail perspective view showing the bows completely extended with the exception that the end bow has not been turned arcuately to cover the rear end of the body.

Figure 5 is a detail perspective view showing the bows without the canvas covering, and the end bow swung down into complete covering position.

Figure 6 is a detail perspective view showing the covering and the bows in a collapsed position against the cabin of the truck.

Figure 7 is a plan view of the master shoe.

Figure 8 is a side elevation of the master shoe.

Figure 9 is an end elevation of the master shoe.

Figure 10 is a plan view of the secondary shoe.

Figure 11 is an end elevation of the secondary shoe shown in Figure 10.

Figure 12 is a side elevation of the secondary shoe shown in Figures 10 and 11.

Figure 12 is a side elevation of the secondary shoe shown in Figures 10 and 11. mechanism.

Figure 14 is an end elevation of the shoe shown in Figure 13.

Figure 15 is a side elevation of the shoe shown in Figures 13 and 14.

Figure 15a is a perspective view showing a shoe lug against a shoulder at the time when the lug begins to move another shoe.

Figure 16 is a sectional view through the shoe housing taken on lines 16—16 of Figure 21.

Figure 17 is a section through the shoe housing taken on the line 17—17 of Figure 21.

Figure 18 is a side elevation of the shoe housing showing the chain and sprocket and the relative positions of the shoes when fully extended.

Figure 19 is a section through the shoe housing showing the sprockets and chains and the relative position of the shoes when completely collapsed.

Figure 20 is a section through the shoe housing showing the shoes in collapsed position and taken along the line 20—20 of Figure 21.

Figure 21 is an enlarged side view of the chain, sprockets and shoes with part of the shoe housing broken away.

Figure 22 is a bottom view with a section through the shoe housing taken on the line 22—22 of Figures 19 and 21.

Figure 23 is a side elevation of parts shown in Figure 17.

I have shown a truck body 1 upon which is mounted a shoe housing 2 that extends the full length of the vehicle body. This housing is divided into three compartments. The upper compartment 3 has sufficient space between the walls 4 and 5 to permit a chain 6 to freely slide therein. This chain extends from one end of the shoe housing to the other, at which ends 7 and 8 are rotatively mounted sprockets 9 and 9a. After passing around the sprockets the chain passes through the lower compartment 10 of the shoe housing and the ends 11 and 12 connect to turn buckles 13 and 13a attached to the master shoe to be hereinafter described.

The sprocket 9 is fixed to a shaft 14 that is rotatively mounted in bearings 15 on the shoe housing. This shaft is rotated by means of a crank 16 exposed on the outside of the shoe housing at a convenient point which can be reached from the cab. The crank may be removably if desired. Rotating this crank causes the sprocket to rotate and pull the chain which in turn, pulls on the master shoe and moves it in either direction, depending upon the rotation of the handle.

The master shoe 17 is also slidably mounted and guided in the lower compartment 10 of the shoe housing and, as has been explained, is moved by means of the chain pulling on it at either end.

This master shoe has a lug 18 through which there is a hole 18a for the turn-buckle 13. When it is desired to take up slack in the chain the nuts 19 are loosened and the turn-buckle is turned in a desired direction until the proper tension is obtained, at which time the nuts are again tightened against the lug 18.

The other end 20 of the master shoe also has a hole 21 for a turn-buckle 13a and similar lock-nuts 22. These turn-buckles connect the master shoe to the ends of the chain.

To the face of the lug 20 is attached a plate 23 for supporting the two end bows, as will be explained. To the plate 23 is attached a concave block 24 which receives a bow 25 and keeps this bow in a vertical position when it is clamped thereon by means of U shaped bolts passing through the holes 26 indicated in Figure 16. The part 17 of the master shoe slides in and supports the master shoe in the lower compartment 10, while a boss like member 27 above the part 17 and somewhat shorter than it, is so positioned that it can slide in the central compartment 26. This particular boss or lug is the means for moving the secondary shoe to be explained.

The plate 23 is T shaped and has two holes 28 and 28a in which are mounted studs supporting two end bows 29 and 29a, so that they are free to be rocked over and cover the end of the truck as is shown in Figure 1. This tipping over is accomplished by means of an angle or L shaped roller guide rail 30 also attached to the truck directly beneath the shoe housing. This rail runs parallel to the shoe housing the full length of the truck except for its end near the tail of the vehicle. By referring to Figures 2, 5 and 23 it can be seen just what shape this end has.

In order to tip the bow, an arm 31 is fixed to a stud 30a which is rotatively mounted in the hole 28a of the plate 23. To this stud a boss 31c is also fixed. This boss has an extension 31a over which the bow is fastened by means of rivets 31b. On the arm 31 are two studs 33 upon which are rotatively mounted rollers 32 for tipping the arm.

By referring to Figure 17 it will be seen that one leg of the L shaped guide passes between the two rollers. When these two rollers reach the curved end they will follow the curvature of the L shaped guide and tip the arm 31 down, which in turn causes the bow 29a to rock arcuately down over the end of the truck because of the action of the rollers on the arm. The bow 29 is mounted for the free rotation in the hole 28 and is secured at its outer bowed top by a strap 29b to the bow 29a so that the pull of the bow 29a moves the bow 29 to an intermediate position in which the covering material will be taut.

The secondary shoe 33b, Figure 10, is supported and guided in the central compartment of the shoe housing. On its right hand end (see Figure 10) there is a projecting lug 34 against which the lug 27 on the master shoe comes in contact to move the secondary shoe. Opposite this lug is another extending block 35 which extends back into the central compartment and prevents the shoe from tipping or turning while sliding. On the left hand end there is a concave block 36 in which bows are rigidly fastened by means of bolts which pass through the holes 36a. This concave block is supported on a plate 37 which extends down from a bar 38 between the two ends of the secondary shoe. Between the plate and bar is a spacer 39 which places the plate 37 far enough forward so as to bring this plate in line with the plate 23 of the master shoe, and also fix the alignment of the concave blocks which position the bows. Another reason for this spacer is to provide a channel for the lug 27 on the master shoe. On the side of the bar 37 and fixed to it is another lug 40 for moving the other shoes to be explained.

The other shoes illustrated in Figures 13 to 15, inclusive, are slightly different from the two shoes described. On the right hand end, as shown in Figure 15, there is a lug 41 for holding the shoes in a non-tipping position while sliding in the central channel. These lugs will vary in length, as can be seen by referring to Figures 20 and 22, depending upon the position they have in the central compartment. The left hand ends have spacers 42 upon which are supported other plates 43 with other concave blocks 44 for fastening other bows to it. The spacers 42 will also vary in width, depending upon their position in the central compartment. The bar 45 between the two ends is narrower over the length between the ends than at its extreme end 46 so as to provide a step 47 with a shoulder 48 against which a lug 49 on each of the shoes, will catch when the master shoe moves the secondary shoe and other shoes in sequence. With this step arrangement it is possible to assemble each one of the shoes with their bars against each other and leave them free to slide independent of each other until the lugs 49 catch on the shoulder 48 and start to move them together, see Figure 15a which shows the position of parts at the instant a leading shoe begins to move the next succeeding shoe.

*Assembly and operation*

The shoe housing is first rigidly mounted on the side of the truck, the chain is then passed through the upper compartment and around both sprockets. The master shoe is then placed so that its supporting guide is in the lower compartment and the chains are attached to it by means of a turn-buckle. The other shoes 50 to 54, inclusive, are then placed in the central compartment in the manner shown in Figure 20. This puts them in position with each of the bars of the respective shoes flat against one another. The secondary shoe is then put into place so that its bar is also against the bar of an adjacent shoe. When all bars are in position, as shown by Figure 20, they will move in the following sequence: The lug 27 will be in a channel 55 provided by the spacer of the secondary shoe. Rotating the sprocket in a counter-clockwise direction with reference to Figure 21, causes the chain to slide and to pull the master shoe towards the right. It will continue to move by itself until the lug 27 comes in contact with the lug 34 of the secondary shoe. When this happens the secondary shoe will start to move and it will be moved along until the lug 40 of the secondary shoe lying beneath the bar 54 comes in contact with a shoulder 48, at which time it will begin to move. After this bar has moved sufficient distance its lug 40 will come in contact with another shoulder 48, at which time the bar 53 will begin to move. The remaining bars will also be moved in the same manner. The operation just explained is for the purpose of extending the cover.

When the master shoe has advanced far enough so that the rollers on the arm will follow the curved portion of the angle guide, the two end bows will tip down over and cover the end of the truck. When it is desired to retract the canopy to uncover the truck, the sprocket 9 is rotated in a clockwise direction and the master shoe begins to move towards the cabin of the truck. As it advances towards the cabin of the truck the rollers supported on the arm will follow up around the curve and cause the two end bows to rock back to vertical position. The master shoe continues to move until this front portion 56 comes in contact with the spacer 39 and starts to move the secondary shoe. After the secondary shoe has moved a certain distance the front end 57 will come in contact with the spacer 42 of another shoe and cause it to move. In like manner the front end of each spacer will come in contact with spacers of the other shoes and cause them to move in a continued sequence until the spaces between each one of the spacers on the shoes has been eliminated.

From the above it can be seen that at no time is the entire load of the canopy moved at the same time. The load is accumulative both in extending and collapsing and therefore makes for efficient mechanical operation, as the full load is not applied until the last bow starts to move. All the bows are also supported in firm non-rattling position.

Having thus described my invention, what I claim as new and desire to secure by Letters Patent, is:—

1. In combination with an automotive vehicle, mechanism for actuating an extension cover comprising a series of horizontally spaced, vertically supported bows held firmly against tipping movement, channels on each side of the truck body, said bows being supported in said channels and mechanism for extending and retracting said bow supports, and said supports comprising slidable members with slidable extensions rigidly attached thereto bracing said members against rattling movement.

2. In combination with an automotive vehicle, mechanism for actuating an extension cover comprising a series of horizontally spaced, vertically supported bows held firmly against tipping movement, channels on each side of the truck body, said bows being supported in said channels and mechanism for extending and retracting said bow supports, and said supports comprising slidable members with slidable extensions rigidly attached thereto bracing said members against rattling movement, said members having interengaging parts arranged respectively in alignment so that the contact of one with an adjoining one will cause its extension and retraction.

3. In combination with an automotive vehicle, mechanism for actuating an extension cover comprising a series of horizontally spaced, vertically supported bows held firmly against tipping movement, channels on each side of the truck body, said bows being supported in said channels and mechanism for extending and retracting said bow supports, and end bows mounted for definitely controlled rocking movement in an arc so as to cover the vertical opening at the end of the vehicle.

4. In a bow type extendible cover for a vehicle, a series of vertically aligned horizontally slidable bows, with end bow members mounted for movement in an arc to cover the end opening in the vehicle, means for supporting said horizontally slidable bows comprising a series of slidable shoes, channelled members in which said shoes are slidable, said shoes having slidable extensions rigidly attached thereto within said channels to prevent rocking of said shoes, said extensions having interengaging members, a master shoe having means for engaging said bow supporting means, and means for moving said master shoe.

5. In a bow type extendible cover for a vehicle, a series of vertically aligned horizontally slidable bows, with end bow members mounted for movement in an arc to cover the end opening in the vehicle, means for supporting said horizontally slidable bows comprising a series of slidable shoes, channelled members in which said shoes are slidable, said shoes having extensions within said channels to prevent rocking of said shoes, said extensions having interengaging members, a master shoe having means for engaging said bow supporting means, and means for moving said master shoe, and means for moving said end bow members in a definitely controlled fixed arc.

6. In a bow type extendible cover for a vehicle, a series of vertically aligned horizontally slidable bows, with end bow members mounted for movement in an arc to cover the end opening in the vehicle, means for supporting said horizontally slidable bows comprising a series of slidable shoes, channelled members in which said shoes are slidable, said shoes having extensions within said channels to prevent rocking of said shoes, said extensions having interengaging members, a master shoe having means for engaging said bow supporting means, and means for moving said master shoe, and means for moving said end bow members in a fixed arc comprising a cam track and rocking arms on which said end bow members are mounted, with rollers on said rocking arms adapted to engage said cam track at the outer end of movement of said cover.

7. In a bow type extendible cover for a vehicle, a series of vertically aligned horizontally slidable bows, means for supporting said horizontally slidable bows comprising a series of slidable shoes, channelled members in which said shoes are slidable, said shoes having slidable extensions rigidly attached thereto within said channels to prevent rocking of said shoes, said extensions having interengaging members, a master shoe having means for engaging said bow supporting means, and means for moving said master shoe.

8. In a bow type extendible cover for a vehicle, a series of vertically aligned horizontally slidable bows, means for supporting said horizontally slidable bows comprising a series of slidable shoes, channelled members in which said shoes are slidable, said shoes having slidable extensions fixedly attached thereto within said channels to prevent rocking of said shoes, said extensions having interengaging members, a master shoe having means for engaging said bow supporting means, and means for moving said master shoe, and the interengaging members of said bow supports effective each on an adjacent bow support.

9. A collapsible body cover for a vehicle comprising in combination with guide channels extending along the sides of the vehicle, a cover member, a series of vertically aligned bows supporting said cover member, sliding members mounting said bows retained within the vehicle channels, and means for actuating said sliding members so as to extend said cover progressively in sequence, while maintaining same in vertically rigid alignment, said means comprising horizontal extensions of said sliding members having interengaging portions.

10. A collapsible body cover for a vehicle comprising in combination with guide channels extending along the sides of the vehicle, a cover member, a series of vertically aligned bows supporting said cover member, sliding members mounting said bows retained within the vehicle channels, and means for actuating said sliding members so as to extend said cover progressively in sequence, said cover being mounted at its outer end on a rocking bow movable with said other bows and positively guided in an arc throughout its arcuate movement.

11. A collapsible body cover for a vehicle comprising in combination with guide channels extending along the sides of the vehicle, a cover member, a series of vertically aligned bows supporting said cover member, sliding members mounting said bows retained within the vehicle channels, and means for actuating said sliding members so as to extend said cover progressively in sequence, said cover being mounted at its outer end on a rocking bow movable with said other bows and positively guided in an arc throughout its arcuate movement, a bow intermediate said outer bow and said vertically aligned bows provided with a flexible connection with said outer bow and mounted for free rotation on an extendable shoe.

12. Mechanism for extending a series of spaced bows for an extension cover comprising a pair of channels having an upper compartment and a lower compartment within which an endless chain is movable, an outer bow having master shoes extending within the lower of said compartments, intermediate bows having sliding supports on which said bows are rigidly mounted, and said master shoes having extensions to engage intermediate bow supporting members.

13. An extension top comprising a series of spaced bows with flexible top covering material thereon, and mechanism for extending said bows comprising a casing and a series of shoes on which said bows are rigidly mounted, said shoes being slidable in said casing, said shoes further having guiding extensions extending in said casing toward extended position of said bows, and a master shoe carrying a pivoted bow having a guiding extension extending oppositely to said other shoes.

14. An extension top comprising a series of spaced bows with flexible top covering material thereon, and mechanism for extending said bows comprising a casing and a series of shoes on which said bows are rigidly mounted, said shoes being slidable in said casing, said shoes further having guiding extensions extending in said casing toward extended position of said bows, and a master shoe carrying a pivoted bow having a guiding extension extending oppositely to said other shoes whereby said master shoe may extend clear to the end of said casing and said pivoted bow pivot beyond the end of said casing.

WILLIAM WOOLCOTT.

CERTIFICATE OF CORRECTION.

Patent No. 1,827,059.  October 13, 1931.

WILLIAM WOOLCOTT.

It is hereby certified that error appears in the printed specification of the above numbered patent requiring correction as follows: Page 1, lines 88 and 89, strike out the paragraph "Figure 12 is a side elevation of the secondary shoe shown in Figures 10 and 11." and insert instead Figure 13 is a top plan view of another shoe used in combination in the operating; and that the said Letters Patent should be read with this correction therein that the same may conform to the record of the case in the Patent Office.

Signed and sealed this 5th day of July, A. D. 1932.

(Seal)

M. J. Moore,
Acting Commissioner of Patents.